INVENTOR.
HARLAND H. HEFFRING,
BY John B Davidson
ATTORNEY $$\frac{X}{P} = a = \frac{10.5}{18.3} = .57$$

$$\frac{Y}{P} = b = \frac{3.8}{18.3} = .24$$

INVENTOR.
HARLAND H. HEFFRING,
ATTORNEY.

INVENTOR.
HARLAND H. HEFFRING,
BY John B Davidson
ATTORNEY.

United States Patent Office 3,409,871
Patented Nov. 5, 1968

3,409,871
ELIMINATION OF MULTIPLE EVENTS ON SEISMOGRAMS OBTAINED AT WATER-COVERED AREAS OF THE EARTH
Harland H. Heffring, Calgary, Alberta, Canada, assignor to Esso Production Research Company, a corporation of Delaware
Filed Oct. 12, 1966, Ser. No. 586,075
7 Claims. (Cl. 340—15.5)

ABSTRACT OF THE DISCLOSURE

Ringing events are eliminated from a trace of a reproducible seismogram taken at marine locations by adjustably attenuating electrical signals produced from a trace, delaying the trace by an amount equal to the seismic wave travel time through the water layer beneath the source, and adding the original signal to the undelayed and unattenuated signal. This process is repeated using a delay equal to the travel time of waves in the water layer beneath the seismic wave detector. The appropriate attenuation and time delay is determined by autocorrelation of traces produced by vertically traveling seismic waves at the ends of a geophone spread.

---

This invention relates to the processing of seismic records, and more particularly to the removal of ghost events from seismic records produced by the reverberation of seismic energy between near surface interfaces.

The general technique of seismic prospecting is well known. Briefly stated, it comprises the generation of a seismic disturbance at or near the earth's surface and the detection of seismic waves produced by the seismic disturbance at one or more detecting locations spaced from the location of the seismic disturbance along a traverse. Alternatively, a number of seismic disturbances can be produced along the traverse and the resulting seismic waves detected at at least one location spaced from the point of generation. In either case, there is produced a seismogram which is comprised of a number of data traces which contains events indicative of the amplitude and frequency of the seismic waves detected at the detecting location. The events are produced by seismic waves which are reflected or refracted at earth formation interfaces at which there is a wave velocity propagation contrast, as well as other seismic waves reaching the detecting locations by other propagation paths. Also, the data traces contain the records of seismic waves which are not produced by the aforementioned artificial seismic disturbance, such as by the wind or by vehicles moving near the detecting location.

In order to glean useful geologic information from the seismogram, it is necessary to identify the events produced by reflected seismic waves from undesired events produced by all of the other seismic waves detected at the detecting locations, which undesired events interfere with and often obscure the useful reflection events. A particularly bothersome type of interference is that produced by seismic energy which is trapped between the earth's surface and the bottom of the weathered layer of the earth, or, at marine locations, between the surface of the water and the water bottom. This seismic energy reverberates so as to produce ghost reflections extending almost the entire length of the seismogram to a distance beyond that at which it is expected that useful reflection information will be obtained. As a result, the relatively weak reflection events from deeper reflection horizons are completely obscured by the reverberation or "ringing" events. It has been known for some time that when seismic energy passes through the weathered layer of the earth or the water layer, this layer operates on the seismic signal somewhat like an undesirable filter. It has also been theoretically possible to eliminate or remove the reverberation or ringing effect of the undesirable near surface layer filter by passing a reproduced data trace through another filter which is the inverse of the near surface layer filter. See, for example, U.S. Patent 3,238,499 to M. M. Backus. A major difficulty with all prior art attempts to eliminate from seismograms the effect of near surface ringing has been that the bottom of the layer responsible for the ringing has been assumed to be level, or at least parallel with the earth's surface. (The earth's surface, as used herein, is considered to be the surface of the water as well as the surface of the ground.) Often, if not usually, this condition does not prevail. For example, in the Grand Banks off Newfoundland it is customary to find that the water bottom slopes relative to the water surface. Therefore, prior art efforts to remove the effects of reverberation or ringing of seismic energy in this area often have been to no avail.

An object of this invention is to provide a technique for removing the effects on seismograms of near surface reverberation or ringing of seismic energy which is applicable to locations on the earth where the upper and lower interfaces of the earth layer within which energy is trapped and reverberates are not parallel, and particularly where the bottom of a water layer on the earth slopes relative to the water surface.

Objects and features of the invention not apparent from the above discussion will become evident from the following detailed description thereof when taken in connection with the accompanying drawings, wherein.

Figure 1:
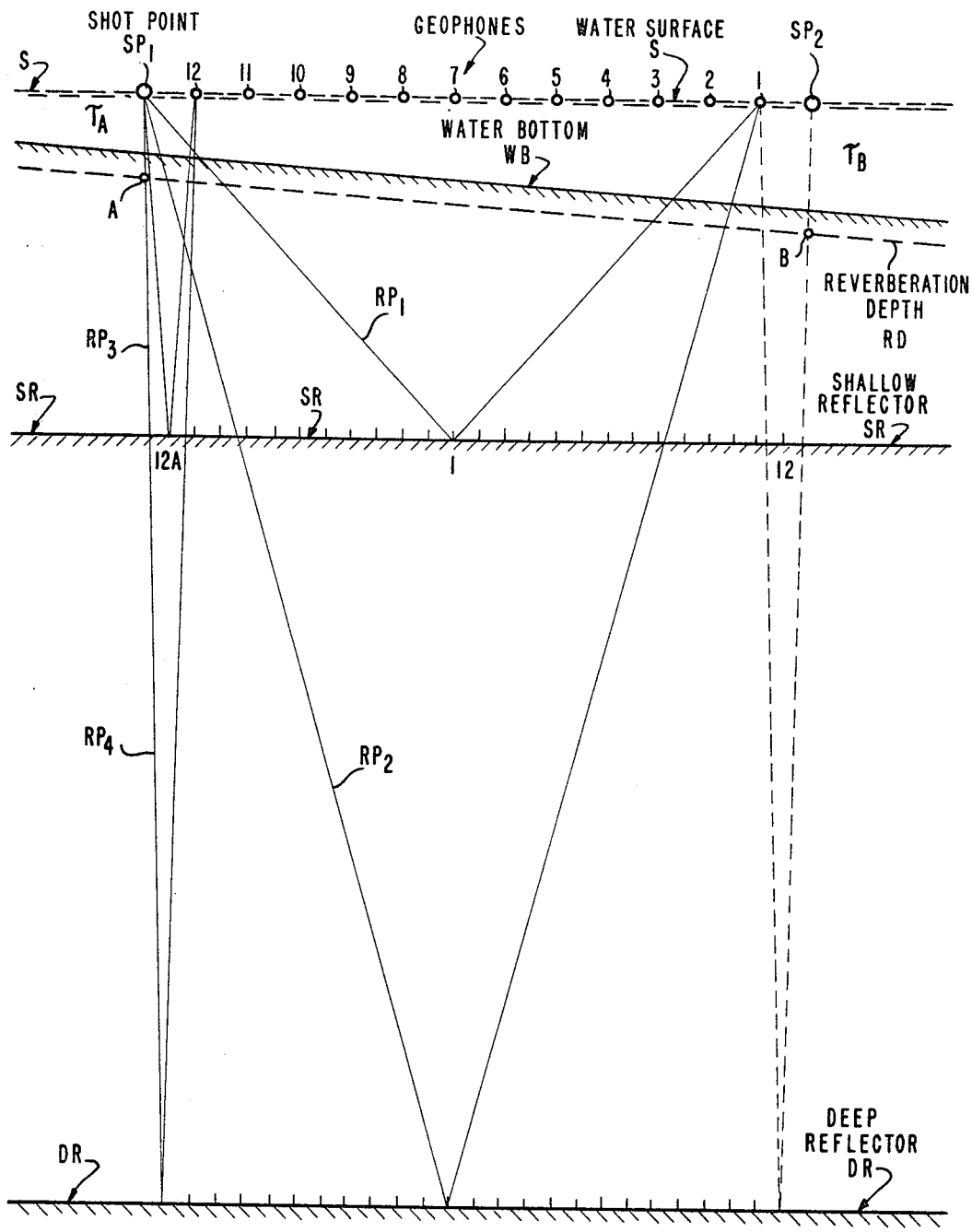
FIG. 1 is an elementary schematic drawing of a section of the earth illustrating in schematic form a seismic observation, which drawing is useful in pointing up the advantages of the invention and in understanding the technique of the invention.

With reference now to FIG. 1, a seismic observation at a water-covered portion of the earth is illustrated in schematic form. When a seismic impulse is produced at a shot point $SP_1$ as by detonating a seismic charge, seismic energy is propagated in all directions, a portion of it going down into the earth through the water and being reflected by a reflecting horizon RD, which is somewhat below the water bottom WB. It is assumed that the depth of the water bottom and the reflecting horizon vary in such a manner that the depth below the shot point $SP_1$ is different from the depth below a detector 1 at a detecting location spaced from the shot point $SP_1$. Seismic energy will be reflected a number of times back and forth between the reflecting horizon RD and the surface S of the water. A portion of the down-traveling energy, however, will pass through the reflecting horizon RD each time that the energy strikes the reflecting horizon RD so that the wave shape of the down-traveling energy will be that of a plurality of pulses spaced apart in time by the time interval that is required for energy to travel upwardly from horizon RD to the water surface S and back down to the horizon RD. Inasmuch as the reflecting coefficient between the water and the air is substantially unity (or more exactly, −1), the amplitude of each successive pulse of seismic energy will be reduced by the factor R where R is the reflecting coefficient between the water and the next lowest earth formation. Thus, if the amplitude of the initially downwardly-going seismic energy is A, and the wave shape can be expressed by $f(t)$, the wave shape of the composite seismic wave will be $Af(t)+ARf(t)+AR^2f(t)+\ldots$ . This composite waveform of seismic energy will be reflected by reflecting horizon DR and returned upwardly through the earth (it being assumed that the depth of DR is sufficiently great that it can be said to a reasonable approximation that the seismic energy goes substantially vertically downwardly and upwardly). The energy will pass through the water layer again before it is detected by detectors 1, 2 . . . . The pulses must again pass through the reverberating water layer where their amplitudes undergo further modification. If the water depth were the same at the receiving location as at the transmitting location (e.g., as at geophone 12), the received signal will be, as a result of the double convolution effect of the water layer, given by the relationship:

$$Af(t)+2ARf(t)+3AR^2f(t)+4R^3f(t)+\ldots$$

In order to eliminate from the received signal the components thereof due to reverberation, it is manifest that it will be necessary to know the reflection coefficient of seismic waves at the reflecting horizon immediately below the bottom of the water layer and the travel time of seismic waves through the water layer both at the transmitting location and at any given detecting location. A filter can then be produced, to which the seismic signal can be applied so that a component in the seismic signal produced by reverberation can be eliminated.

In accordance with one aspect of the present invention, it has been found that the reflection coefficients and the two-way travel time of seismic waves between the earth's surface and such reflecting horizon can be determined for any given location by autocorrelating a seismic trace derived from a geophone or seismophone stationed immediately adjacent the location of a seismic disturbance at such location. This can be shown as follows, where the symbols used have the following designations.

$$R=R_S R_B$$

where:

$R_S$=reflection coeff. of water-air interface≃−1 (a near-perfect reflector)
$R_B$=reflection coeff. of water-bottom interface $$=\frac{D_B V_B - D_W V_W}{D_B V_B + D_W V_W}$$

and where $-1 < R_B < 1$.
$D_B$=Density of bottom material
$V_B$=Velocity in bottom material
$V_W$=Velocity in water
$D_W=1$ $$\tau=\frac{2d}{V_W}$$

where:
$d$=water depth
$V_W$=velocity of sound in water
$\delta(t)$=unit impulse Inasmuch as the following discussion refers to infinite band width, only spike functions need be considered. As a result of the modification of down-going seismic waves by the water layer, the down-going seismic signal below the bottom of the water layer can be defined by the equation (1) $\quad f(t)=\delta t+R\delta(t-\tau)+R^2\delta(t-2\tau)+\ldots$ Assuming the water depth to be the same at the receiving location as the transmitting location, the received signal can be given by the following equation:

(2) $\quad f_R(t)=\delta(t)+2R\delta(t-\tau)+3R^2\delta(t-2\tau)+\ldots$

The impulse response of an inverse filter necessary to dereverberate the transmitted signal $f(t)$ is:

(3) $\quad h(t)=\delta(t)-R\delta(t-\tau)$

Therefore, to dereverberate the received signal $f_R(t)$, it is necessary to convolve twice with $h(t)$ of Equation 3 which gives:

(4) $\quad h_R(t)=\delta(t)-2R\delta(t-\tau)+R^2\delta(t-2\tau)$

The $k$th term of the autocorrelation function of Equation 4 is given by the relationship (5) $k$th term is:
$$kR^{k-1}+2(k+1)R^{k+1}+3(k+2)R^{k+3}+\ldots$$

where $K=1$ to $n$

The normalized $k$th term reduces to (6) $$\frac{kR^{(k-1)}(1-R^2)+2R^{k+1}}{1+R^2}$$

The amplitude of the primary pulse of the autocorrelation function given immediately above (i.e., $k=1$) is given by (7) $$p=\frac{R^0(1-R^2)+2R^2}{1+R^2}=\frac{1+R^2}{1+R^2}=1$$

The relative amplitude of the secondary pulse of the autocorrelation function (i.e., $k=2$) to the primary pulse thereof is (8) $$a=\frac{2R}{1+R^2}$$

and the relative amplitude of the tertiary pulse to the central pulse is given by (9) $$b=\frac{R^2(3-R^2)}{1+R^2}$$

From the general expression for the $k$th term given above, any order of pulse due to simple reverberation can be related to the reflection coefficient.

Figure 4:
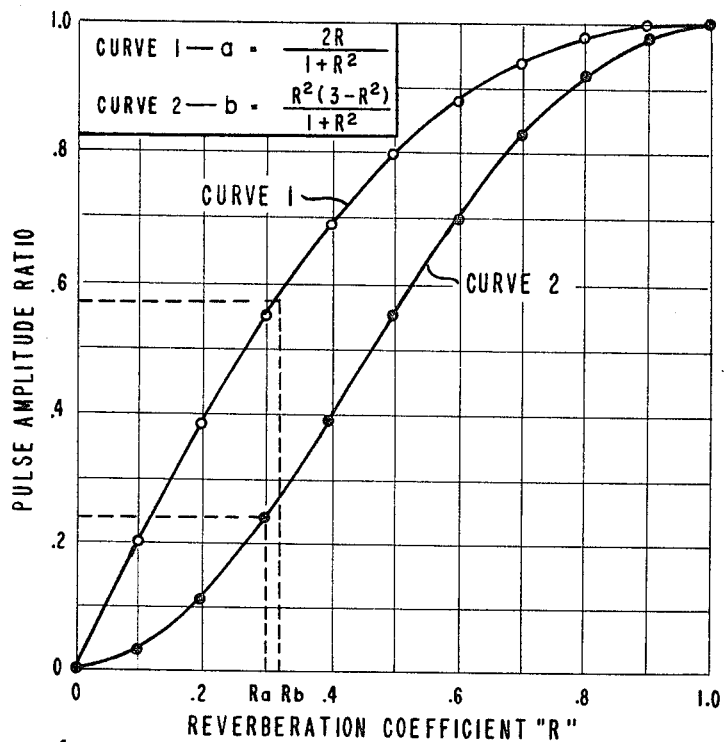
FIG. 4 is a coordinate plot of the pulse amplitude ratio obtained from FIG. 3 as a function of reverberation coefficient obtained from the formulas noted on FIG. 4.
Figure 3:
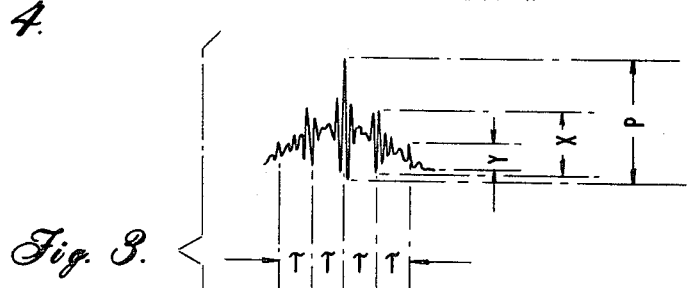
FIG. 3 is a correlogram curve such as may be obtained with the apparatus of FIG. 2.

Refer now to FIG. 3 wherein there is shown an autocorrelation curve such as can be obtained from a seismogram trace. The curve shown is typical and is one that actually was obtained from a trace produced as described above from the output signal of a geophone stationed immediately adjacent a seismic disturbance location. Assuming the amplitude of the primary pulse to be "$p$," the quantity "$a$" will be the ratio "$x$" of the secondary pulse to the amplitude of the primary pulse, or $$\frac{x}{p}=a=.57$$

and where "$y$" is the amplitude of the tertiary pulse, $$b=\frac{y}{p}=.24$$

for the specific autocorrelation curve illustrated in FIG. 3. The quantities "$a$" and "$b$" can be substituted in Equations 8 and 9 above to find the reflection coefficient. Alternatively, the curves defined by the relationships can be drawn on a coordinate scale, as shown in FIG. 4, and the reflection coefficients can be determined from the scale. It will be noted that for the specific examples given above, there is a slight deviation in the reflection coefficients which, however, is within a reasonable margin of error and is not at all to be unexpected.

Figure 6:
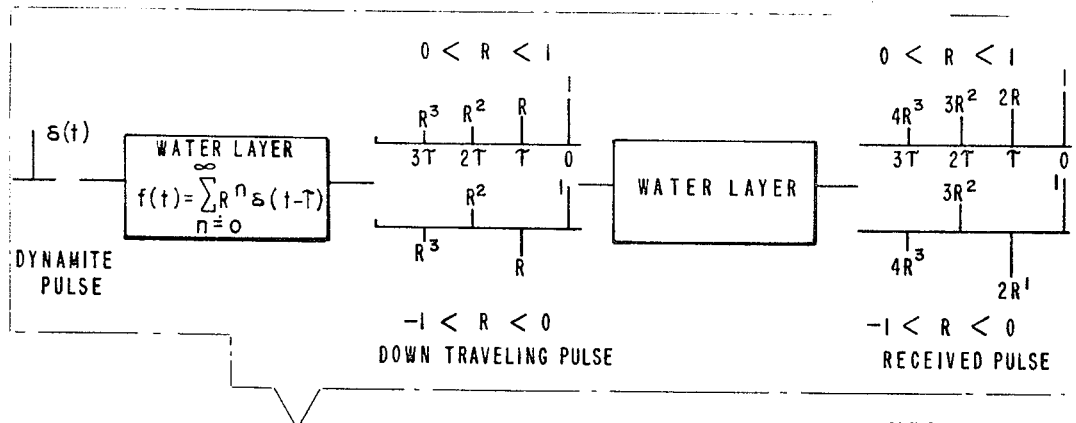
FIG. 6 is a block diagram illustrating the reverberation problem assuming a spike seismic pulse.

Refer again to FIG. 1 wherein there is shown in schematic form a seismic observation performed at a marine location, and to FIG. 6 wherein there is shown a block diagram illustrating the reverberation problem. There is illustrated in FIG. 1 a geophone spread comprising a plurality of geophones bearing the reference numerals 1–12 substantially equidistantly disposed between seismic disturbances, or shot point locations $SP_1$ and $SP_2$. Not shown are conventional recording equipment, boats, electrical leads, etc., to avoid cluttering the drawing. $SP_1$ is located just adjacent geophone 12 and $SP_2$ is located adjacent geophone 1. The geophones and shot points are designated as being at the water surface for convenience of representation, it being understood that in practice the geophone and the shot point locations will be somewhat below the surface of the water. The water bottom WB is illustrated as being sloping and the reverberation depth at which trapped energy reverberates between the water surface S and the reverberation depth RD as being somewhat below the water bottom WB. There is also illustrated a shallow reflector SR and a deep reflector DR below the reverberation depth RD. When a seismic disturbance is produced at location $SP_1$, the seismic energy detected by geophone 12 will include reflection energy following ray paths $RP_3$ to reflector SR and ray path $RP_4$ to reflector DR. As indicated above, the energy following ray paths $RP_3$ and $RP_4$ will comprise wave trains produced by the initially down-going pulse and the subsequent pulses from the multiply reflected energy reverberating back and forth between the surface and the reverberation depth RD. In addition, some of the reverberating energy will be detected by geophone 12 so that the sum total of the energy detected thereby will be a very complex waveform. The energy produced at shot point $SP_1$ will also be detected by the other geophones in the spread; for example, the energy detected by geophone 1 will follow ray paths $RP_1$ and $RP_2$, and also will be very complex as a result of the sequential pulse in the seismic wave train produced by the initially down-going energy and the subsequent reverberations. The energy detected by geophone 12, however, will contain components that are shifted by the same time shift when both down-going and up-coming. The energy following ray paths $RP_1$ and $RP_2$ to geophone 1 will suffer time shifts when traveling downwardly to reflectors SR and DR different from the time shift that they suffer in their upward travel immediately before being detected by geophone 1. Therefore, the trace produced by geophone 12 as a result of a seismic disturbance at location $SP_1$ can be autocorrelated as described above to determine time shift $\tau_A$ and the reflection coefficient R, while the trace produced by geophone 1 cannot so be used. In order to deteermine the time shift $\tau_A$ suffered by substantially vertically traveling energy passing through the water layer below geophone 1, it is necessary to produce a seismic disturbance at shot point $SP_2$, produce a trace from the output signal of geophone 1, and autocorrelate that trace, as described above. The amplitudes of the pulses on the autocorrelation traces thus obtained can be used in the manner described above to determine the time shifts $\tau_A$ and $\tau_B$ and, if there is any difference in the reflection coefficients at points A and B beneath shot points $SP_1$ and $SP_2$, respectively, this can also be determined. A fathometer record of the depth of the bottom beneath locations $SP_1$ and $SP_2$ can be used to interpolate the time shifts beneath the geophones 2, 3, 4, 5, 6, 7, 8, 9, 10, and 11 to a reasonable degree of accuracy, these time shifts being between the time shifts $\tau_A$ and $\tau_B$. The seismogram produced by the seismic disturbance at shot point $SP_1$ from the output signals of seismic detectors or geophones 2–11 is spread-corrected by conventional techniques and apparatus to remove the time errors produced by angularity in the travel paths or ray paths of reflected seismic energy passing through the earth between the source of seismic energy and the geophones. In effect, then, the times of reflection events on the time axis of the seismogram will be as if the seismic energy producing given reflection events moved vertically through the earth from the seismic disturbance location to the interface responsible for the given reflection events and back to the geophones.

The reverberation problem is illustrated in block diagram form in FIG. 6. A seismic pulse, which is represented as a spike function $\delta(t)$, is applied to a water layer such that the seismic signal passing through the layer can be represented by the equation:

$$f(t) = \sum_{n=0}^{\infty} R^n \delta(t - n\tau)$$

When the reflection coefficient of the bottom of the water layer is between 0 and −1, the pulse train of the signal passing through the water layer will be the lower pulse train illustrated between the water layer blocks. When the reflection coefficient is between 0 and 1, the pulse train passing through the water layer will be the upper pulse train illustrated between the water layer blocks. After being reflected, the pulse train will pass upwardly through the earth and through the water layer and will again be modified by further reverberation within the water layer. The received pulse train, when the reflection coefficient is between 0 and −1, will be the lower train illustrated to the right of the second water layer block, and when the reflection coefficient is between 0 and 1, it will be the upper pulse train so illustrated.

Figure 5:
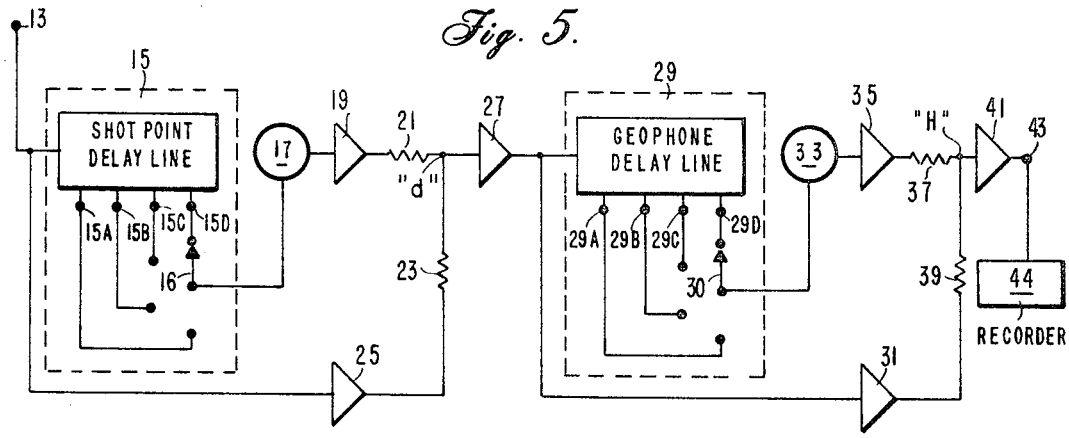
FIG. 5 is a schematic electrical digram of a delay line inverse filter in accordance with the invention.

Each trace of the spread-corrected seismogram now may be reproduced as an electrical signal and applied to a delay line inverse filter apparatus, which may be as illustrated in FIG. 5. Input terminal means 13 are connected to the input circuits of a delay line 15 having a plurality of output terminals 15A, 15B, . . . 15N, at which the signal applied to the delay line from terminal 13 will appear with different time shifts therebetween. The output terminals 15A, 15B, . . . 15N are connected to a selector switch 16 having a wiper arm for selectively connecting the output terminal thereof to the various output terminals 15A, 15B, . . . 15N of delay line 15. The output of the selector switch 16 is connected to a variable attenuator 17. The output signal from the attenuator 17 is applied to an isolating amplifier 19. The input terminal means 13 is also connected to an isolating amplifier 25. The output signals from amplifiers 19 and 25 are connected through resistors 21 and 23, respectively, to a summing point D at the input of an isolating amplifier 27. The output signal from amplifier 27 is connected to a second delay line 29 having output terminals 29A, 29B, 29C, . . . 29N, which is similar to delay line 15. Output terminals 29A, 29B, 29C, . . . 29N are respectively connected to contacts on a selector switch 30, the output of which is connected to the isolating amplifier 35 through adjustable attenuator 33. The output signal amplifier 27 is also connected to the input of isolating amplifier 31, and the outputs of amplifiers 31 and 35 are respectively connected to a summing point H through resistors 39 and 37. The summed signal at isolating point H is connected to amplifier 41, the output of which is connected to an output terminal 43. The signal appearing at terminal 43 is applied to a suitable recorder 44.

Let it be assumed that it is desired to process the traces of a seismogram by producing a seismic disturbance at location $SP_1$ and by detecting the resulting seismic waves with geophones 1–12 as described above. Initially, as described above, the trace produced by geophone 12 as a result of this disturbance is autocorrelated and the time shift $\tau_A$ and reflection coefficient R are determined. Selector switch 16 is adjusted until the output terminal is contacted that will produce the time shift thus determined. Attenuator 17 is adjusted in accordance with the reflection coefficient thus determined from the autocorrelation function of the output signal of geophone 12 to attenuate the signal applied thereto by the product of the attenuation coefficients of the air-water interface and the reflection coefficient at the bottom of the water layer. Since the former is substantially unity, this means that the attenuator is adjusted to attenuate the signal so that the output signal is equal to the input signal times the reflection coefficient. In other words, attenuator 17 is adjusted so that the first output pulse thereof will cancel the second output pulse in the output signal of amplifier 25 appearing at summing point D, the first output pulse from amplifier 19 being delayed by the delay line 15 and selector switch 16 to appear concomitantly with the second output pulse from amplifier 25. Similarly, delay line 29 and attenuator 33 are adjusted to give the same time delays as delay line 15 and attenuator 17. When the trace on the seismogram produced by the disturbance at $SP_1$ from the output signal of geophone 12 is applied to the delay line inverse filter, the output signal will have the reverberation components removed. The output signal from amplifier 41 is recorded as a trace by recorder 44. Switch 30 is now adjusted to give the time delay determined as above from the interpolation between the delays determined for substantially vertically moving energy at shot points $SP_1$ and $SP_2$ and by interpolation from a fathometer reading between the shot points, and the trace on the seismogram produced from the output signals of geophone 11 is applied to the filter and the output signal of the filter is recorded by recorder 44 along the same time axis as the trace of the output signal produced when the reproduced trace of geophone 12 is applied thereto. The same procedure is followed for the reproduced traces of geophones 10, 9, 8, 7, 6, 5, 4, 3, 2, and 1 the switch 30 being adjusted to provide the appropriate time delay for each trace. The final result will be a corrected seismogram from which the reverberation events are removed.

Figure 5A:
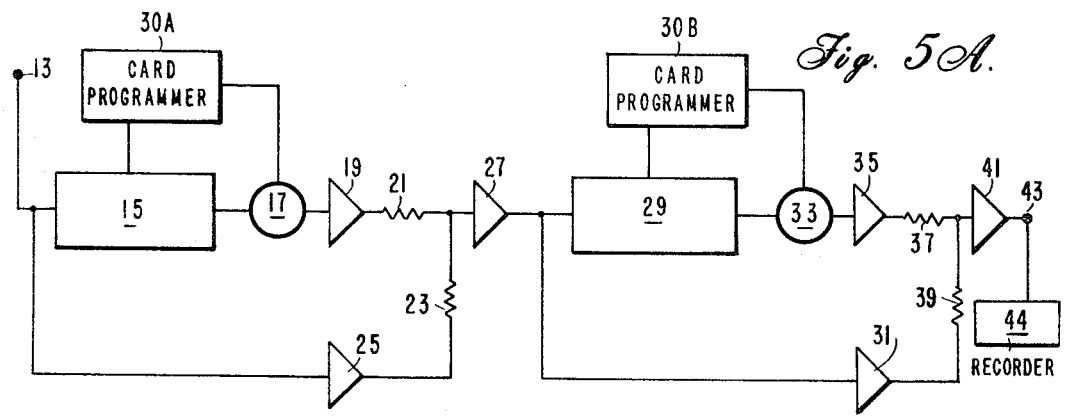
FIG. 5A is a schematic electrical diagram of a modification of the filter of FIG. 5.

In FIG. 5A there is illustrated a modification of the apparatus of FIG. 5 wherein identical components are given the same reference numerals. The difference between the two embodiments lies in the manner of controlling the delay of delay lines 15 and 29 and the attenuation of attenuators 17 and 33. The delay of delay line 15 and attenuator 17 is controlled by an IBM card programmer 30A while the delay of delay line 29 and the attenuation of attenuator 33 is controlled by a card programmer 30B. The card programmers 30A and 30B can be apparatus such as a model 4000 card reader manufactured by Industrial Timer Corporation, Parsippany, N.J. Such apparatus makes use of a plurality of switches having feeler contacts which are connected to an output buss through holes in IBM-type punch cards. Thus, a particular output circuit of the delay line 15 or the delay line 29 that produces a given time delay is connected to the attenuator 17 by means of a switch, the contacts of which are completed through a hole in an IBM card. One card for each record may be produced, the holes of which would selectively connect the output terminals (such as terminals 15A, 15B, ... 15N of FIG. 5) to an output line connected to the input of attenuator 17, and the sections of the attenuator 17 may be appropriately short-circuited or by-passed, as desired, through an appropriate hole or appropriate holes in the punch card. Thus, one punch card will be sufficient to control delay line 15 and attenuator 17, and one card is sufficient to control delay line 29 and attenuator 33. The card programmers either can be actuated manually or through appropriate linkages or electrical controls to the drum of a seismic trace reproducer.

Figure 2:
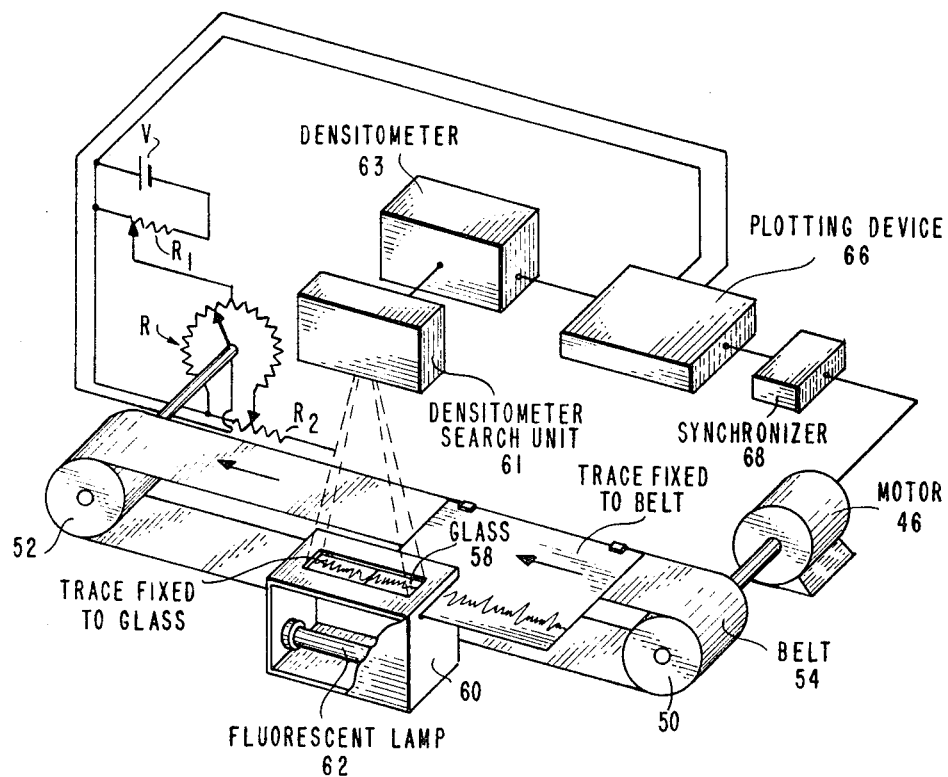
FIG. 2 is an elemental schematic illustration of apparatus useful for performing autocorrelation in accordance with the invention.

In FIG. 2 there is illustrated a suitable electro-optical correlator for producing an autocorrelation of a seismic trace that is recorded in variable density form. The correlator includes a motor 46 having an output shaft driving a drum 50. An endless belt 54 is arranged between drums 50 and 52 such that rotation of drum 50 will drive the belt. An areally diffuse light source is provided by a light box 60, within which is mounted a fluorescent lamp 62. Light from the lamp 62 impinges on a ground glass 58 having the quality of scattering light rays to a high extent so that light from lamp 62 is substantially uniform thereover. A densitometer search unit 62, including a photocell, is used to detect the light passing through the glass 58 and the variable density traces described below. Search unit 61 may be a unit as manufactured by Photovolt Corporation of New York City, Model 520-A. The output of the densitometer search unit is applied to an amplifier 63. The output signal from the amplifier 63 is applied to a two-dimensional plotting device 66, which may be an X-Y recorder manufactured by F. L. Mosely Company of Pasadena, Calif., having a pen which is deflected by an amount proportional to the voltage applied thereto and which drives a recording chart on which the pen records as a function of time.

A seismogram trace produced from a geophone located immediately adjacent the location of a seismic disturbance, as described above, is recorded a number of times in side-by-side relationship on photographic film or similar material so as to provide a broadened trace, the width of which is substantially equal to the width of the aperture produced by the glass 58. This trace is affixed over the aperture so that light passing therethrough is proportional to the density of the trace on the film. By conventional photo-duplicating techniques, two such broadened traces are made which are exact duplicates of each other. The second trace is applied to a carrying plate having an aperture therein of the same dimensions as the aperture of glass 58. The second film is applied over the aperture. The motor 46 is connected to the Mosely plotter 66 through a synchronizer 68, which may be a gear mechanism, a tie rod or plate, or the equivalent, so that the motion of the belt 54 is coordinated with the motion of Mosley plotter 66. The drum 52 is connected to a potentiometer R, the end terminals of which are connected to a variable resistor $R_2$. The wiper and one end of potentiometer R are connected to the Mosley plotter so that the voltage therebetween subtracts from the voltage from amplifier 63. A tap on potentiometer R is applied to the tap of resistor $R_1$ which is connected across a source of voltage V, which is also connected to one end of potentiometer R. Potentiometer R is linear and center-tapped.

To begin the operation, the trace fixed to the movable belt 54 is positioned so as to pass under the glass 58, to which another trace is also affixed. Motor 46 is energized to drive the trace on belt 54 over the other trace affixed to glass aperture 58. The result is that the amount of light passed through the traces will be steadily varied and will reach a peak at maximum correlation therebetween, and will further produce side lobes or peaks in accordance with the usual correlation function. Once the correlation procedure is initiated, it is continued until the aperture has progressed an equal distance on the other side of the aperture of glass 58. During this interval, a continuous write-out of the correlation function is recorded on the Mosely plotter. In effect, the amount of light that would be passed by the individual films or traces are cross multiplied and the product is integrated by the photocell of the densitometer search unit 61. Thus, at any instant multiplication of an increment of the superimposed traces is proportional to the product of the transmissivities of the films for that increment. This product is proportional to the intensity of the light received through the increment. At any given instant all of the intensities of light from the incremental products are summed by the photocell, thus creating a single electrical voltage representing an output point.

Since all of the light values are positive in this device, the desired output is superimposed on a bias function which is in effect the autocorrelation of the two identical rectangular apertures. The amplitude of the bias function is dependent on the background density of the variable density trace. The bias function is removed by the voltage waveform generated by resistors R, $R_1$, and $R_2$. $R_1$ adjusts the amplitude of the waveform while $R_2$ adjusts its symmetry. The voltage waveform is applied to the Mosely plotter concomitantly with the output signal from the amplifier 61. The differential voltage (i.e., the voltage from the amplifier 61 less the compensating bias voltage) deflects the pen on the Mosely plotter, thus giving a visual write-out.

Having described the principle of the invention and the best mode of applying that principle, it is to be understood that the apparatus is illustrative only and that other

I claim:

1. In seismic surveying at marine locations wherein a seismic record is formed by producing a first seismic disturbance at a first transmitting location on a seismic traverse, detecting the resulting seismic waves at a plurality of detecting locations between said first transmitting location and a second transmitting location on the traverse, making individual recordings as a function of time of the amplitudes of the individual seismic waves thus detected, and making necessary dynamic corrections on the individual recordings to form said seismic record, the method of filtering said seismic record comprising:

(a) autocorrelating the seismic record corresponding to the first detecting location nearest said first transmitting location to form a correlogram;

(b) measuring the time interval between given correlation events on the correlogram thus formed which are identifiable as having been produced by reverberating seismic waves in the water layer to determine the two-way travel time of reverberated seismic waves in the water layer beneath said first transmitting location;

(c) measuring the relative amplitudes of said given correlogram events to determine the reflection coefficient of the earth interface at the bottom of the water layer;

(d) producing a second seismic disturbance at said second transmitting location, and detecting and making a recording as a function of time of the resulting seismic waves arriving at a location immediately adjacent said second transmitting location;

(e) with said recording produced from said second seismic disturbance, repeating steps (a), (b), and (c);

(f) measuring the water depth between said first and second locations to determine the two-way travel time gradient between said first and second locations;

(g) forming a counterpart signal of the recording corresponding to one of said detecting locations delayed by an interval equal to the two-way seismic wave travel time determined by step (b) above, and amplified by an amount such that the ratio of the amplitude of the delayed signal to the undelayed signal is equal to the square of the reflection coefficient at the bottom of the water layer;

(h) algebraically combining said counterpart signal and a signal produced from said recording corresponding thereto to form a combined signal;

(i) forming a second counterpart signal of said combined signal delayed by an interval equal to the two-way seismic wave travel time in the water layer at the detecting locations corresponding to said given recording and amplified by an amount such that the ratio of the amplitude of said combined signal to said second counterpart signal is equal to the squared product of the reflection coefficient at the top and bottom of the water layer;

(j) algebraically combining said combined signal and said second counterpart signal to form a second combined signal, and producing a recording of said second combined signal.

2. In seismic surveying at marine locations wherein a seismic record is formed by producing a seismic disturbance in the water at a first transmitting location on a seismic traverse, detecting the seismic waves produced by said first disturbance with a seismic transducer located at a plurality of detecting locations between said first transmitting location and a second transmitting location on said traverse, and making individual time recordings of the transducer output signals, the improvement comprising:

(a) measuring the two-way travel time of seismic waves reverberating in the water layer by being reflected back and forth between the water surface and the earth layer immediately beneath the water layer at said first transmitting location and at said second transmitting location, and the reflection coefficient of the seismic wave reflection boundary formed by the water layer and said earth layer immediately therebelow;

(b) measuring the depth of the water along said traverse between said first and second transmitting locations to determine the two-way travel time gradient between said first and second locations;

(c) forming a first time series of one of said time recordings;

(d) forming a first counterpart time series of said first time series delayed by said two-way travel time measured at said first transmitting location and decreased in amplitude by substantially said reflection coefficient;

(e) algebraically combining said first time series and said counterpart time series to form a combined time series;

(f) forming a second counterpart time series of said combined time series delayed in time relative to said combined time series by said two-way travel time at the location of the transducer corresponding to said one of said time recordings and decreased in amplitude by substantially said reflection coefficient; and (g) algebraically combining said combined time series and said second counterpart time series to produce an output time series, and recording said output time series.

3. The method of claim 2 wherein two-way travel time at a given transmitting location is measured by autocorrelating a seismic record produced from the output signals of a geophone stationed sufficiently near said given transmitting location that seismic waves produced at said transmitting location and reflected from the interface of the water layer and the earth formation immediately therebelow are substantially vertically traveling to produce an autocorrelogram, and measuring the time shift between major pulses on the autocorrelogram including the central pulse.

4. The method of claim 3 wherein the autocorrelated seismic record is a trace on a photosensitive recording medium variable in light transmissivity in accordance with the amplitude of a seismic transducer output signal, and wherein the autocorrelogram is produced by forming a second trace identical to the trace to be correlated, passing light of uniform areal distribution through the entirety of the trace to be correlated, passing the second trace over the trace to be correlated to intercept light rays passing therethrough, detecting light passing through both traces and producing an electrical signal indicative of the total light passing through both traces, forming a second electrical signal variable in accordance with the movement of the second trace over the trace to be correlated proportional to the length of the second trace over the trace to be correlated, producing an output signal equal to the distance between the first and second signals and recording said difference signal.

5. The method of measuring the two-way travel time of seismic waves reverberating in a water layer on the earth, comprising:

producing a seismic disturbance in said water layer; at a location in the water layer in the immediate vicinity of said disturbance such that reflected seismic waves from the bottom of said water layer are substantially vertically traveling;

detecting with seismic transducer means the seismic waves produced by said seismic disturbance;

forming a time record of the output signals of said seismic transducer means;

autocorrelating said time record to form an autocorrelogram; and measuring the time shift between adjacent major pulses on said autocorrelogram, said time shift being equal to said two-way travel time.

6. The method of measuring the reflection coefficient R of seismic waves at the bottom of a water layer on the earth and the two-way travel time of seismic waves reverberating in said water layer in accordance with claim 5 further including the step of measuring the ratio $A_k$ of the amplitude of one of the major side pulses of said autocorrelogram to the amplitude of the central pulse thereof for substitution in the equation $$A_k = \frac{kR^{k-1}(1+R^2) + 2R^{k+1}}{(1+R^2)^3}$$

where $k$ is the number of the side pulse measured from the central pulse, plus one.

7. The method of claim 5 wherein said time record is formed on a photosensitive recording medium by varying the light transmissivity of the medium in accordance with the amplitude of the seismic transducer means output signal, forming a duplicate time record of said time record, subjecting the entirety of one of said time records to light rays from an areally uniform light source, passing the other time record over said one time record, producing a first electrical signal proportional to the portion of said other time record that is over said one time record, detecting and producing a second electrical signal proportional to the light passing through both of said time records, subtracting said first electrical signal from said second electrical signal, and recording said second electrical signal as a function of movement of said other time record.

References Cited

UNITED STATES PATETNS

| | | | |
|---|---|---|---|
| 2,981,928 | 4/1961 | Crawford et al. | 340—15.5 |
| 3,030,021 | 4/1962 | Ferre | 235—181 |
| 3,155,451 | 11/1964 | Dunster et al. | |
| 3,346,862 | 10/1967 | Raudsep. | |

RICHARD A. FARLEY, *Primary Examiner.*

D. C. KAUFMAN, *Assistant Examiner.*